Jan. 7, 1969  D. D. HERSHBERGER  3,421,034
SINGLE-PHASE INDUCTION ELECTRIC MOTOR
Filed Dec. 13, 1967  Sheet 4 of 4

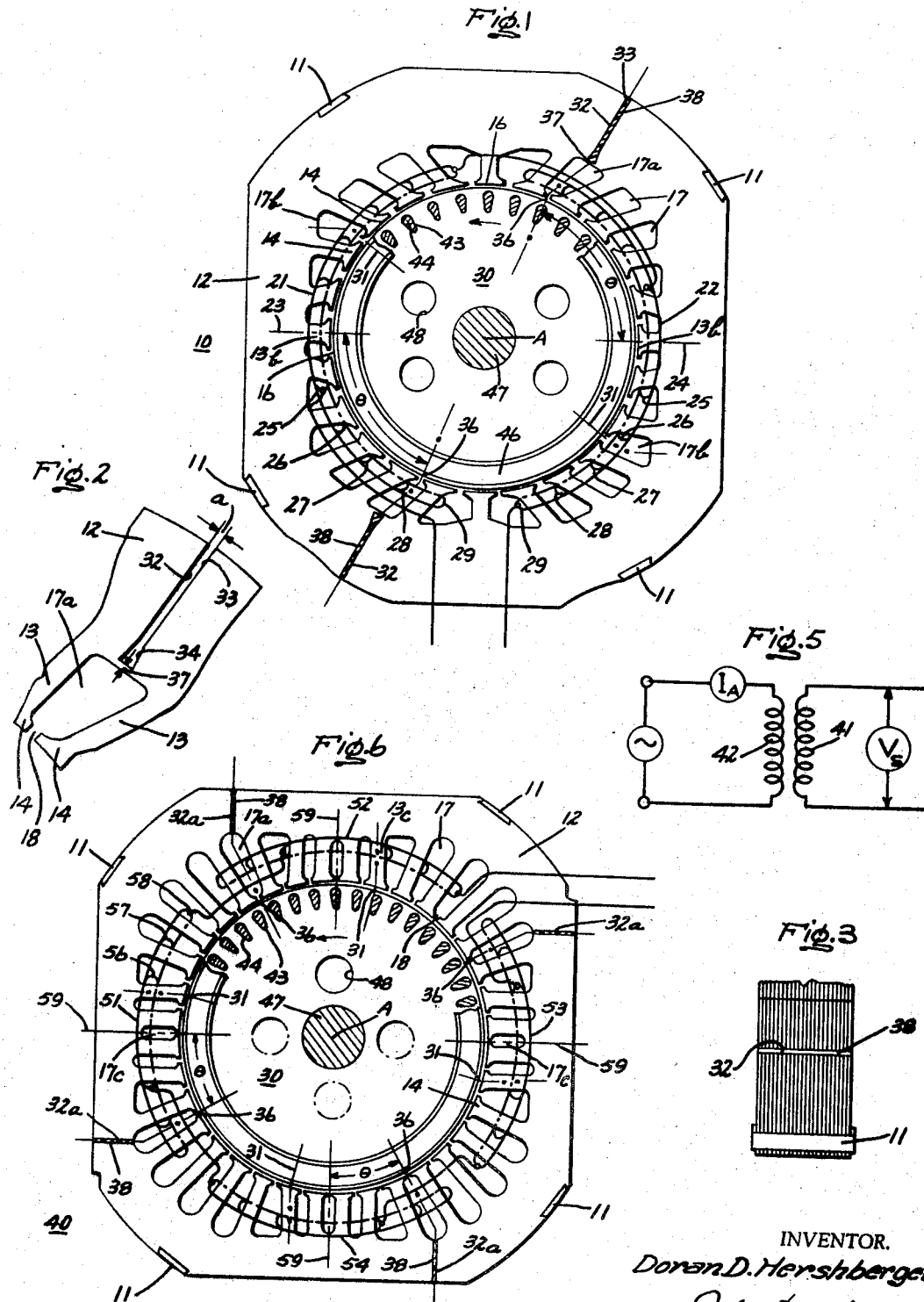

INVENTOR.
Doran D. Hershberger,
BY John M. Stoudt
Attorney

United States Patent Office 3,421,034
Patented Jan. 7, 1969

3,421,034
SINGLE-PHASE INDUCTION ELECTRIC MOTOR
Doran D. Hershberger, Sycamore, Ill., assignor to General Electric Company, a corporation of New York
Continuation-in-part of application Ser. No. 555,732, June 7, 1966. This application Dec. 13, 1967, Ser. No. 697,546
U.S. Cl. 310—172        16 Claims
Int. Cl. H02k 17/10

ABSTRACT OF THE DISCLOSURE

Maximum efficiencies in excess of 40% and satisfactory starting torques are capable of being attained in single phase induction electric motors without need for start windings, among other advantageous features. To achieve these ends, a stator has coil groups which form at least two magnetic poles and includes a direct axis having maximum permeance disposed away from the polar axes between 20° and 70° in the direction of rotation of the secondary member. The quadrature axis of minimum permeance is displaced approximately 90 electrical degrees from the direct axis. The core has certain magnetic restrictions located either in the yoke section in the vicinity of the direct axes, or at their air gap with a high resistivity in the vicinity of the quadrature axes, or at both locations. Moreover, the ratio of the quadrature axis magnetizing reactance to the direct axis magnetizing reactance should be in the range from 0.25 to and including 0.70. These interrelationships produce an unusually effective phase shift in the flux components and a good balance of starting and running performances.

Cross-reference to related application

This is a continuation-in-part of my co-pending application Ser. No. 555,732 filed June 7, 1966.

Background of the invention

This invention relates to alternating current single-phase induction type electric motors and more particularly to stators for such motors which attain satisfactory starting and running operation for many applications without employing an auxiliary winding.

One of the most widely used single-phase induction type electric motor is the split-phase motor having a laminated stator core carrying two separate and distinct stator windings of different impedances, so-called distributed wound main and auxiliary windings with phases usually spaced ninety electrical degrees apart, which are usually connected in parallel across an alternating current power line for starting purposes. The arrangement disclosed in the A. A. Brammerlo Patent 3,235,762 is representative of such motors in commercial use today. These windings are normally wound with coil groups having at least two coils of predetermined turns arranged symmetrically about a central coil group axis to form magnetic poles and to provide approximate sinusoidal ampere-turn patterns in an attempt to produce the best possible operating results for a given size motor. The enormous popularity of these motors is based, at least in part, upon their simple and reliable, yet unusually rugged and economical construction. Further simplifications and economies could be realized if the need for the auxiliary winding were obviated, with the single-phase motor being capable of achieving adequate starting and running performance. It is particularly desirable if such simplifications and economies could be effected without necessitating substantial changes to the equipment employed in their mass production manufacture; e.g., lamination punching machines and main winding machines. It is also desirable to retain the ability to furnish an approximate sinusoidal ampere-turn pattern for the main winding.

In studying this problem, I have found that by creating distinct quadrature and direct axes stator locations having minimum and maximum permeances respectively at predetermined electrical angular positions with respect to the central coil group axes, a definite shift in phase angle between components of flux is effected to produce starting operation of the motor without need for the auxiliary winding. At the same time, I have determined ways in which the quadrature and direct axes locations can be predetermined or predicted and adequate starting and running performances obtained with operating efficiencies exceeding 40%.

Summary of the invention

It is therefore a primary object of the present invention to provide an improved single-phase induction type electric motor and a more specific object is the provision of stators for use in such motors which have a majority, if not all, of the desirable features mentioned above.

It is another object of the present invention to provide improved stators having main distributed wound windings for use in single-phase induction type electric motors which are simple and economical in construction and obviate the necessity of an auxiliary winding without requiring that substantial modifications be made either to the main windings or to stator core fabricating equipment.

It is yet another object of the present invention to provide low-cost stators having at least two coil groups for use in single-phase induction type motors which include distinct quadrature and direct axes locations at discernable electrical angular positions relative to the axes of the coil groups and which produce adequate starting and running performances without utilization of auxiliary windings.

In carrying out the objects of the invention in one form, I provide an improved stator for use in a single-phase induction type electric motor in which the stator core, such as stacked laminations fabricated of magnetizable material, has a number of teeth sections joined at one end to a yoke section to provide a plurality of coil accommodating slots. The other end of the individual teeth sections have terminal portions which together form a bore for receiving a revolvable member. At least two coil groups are disposed in the slots, with the coils arranged symmetrically about a coil group axis, to form a corresponding number of magnetic poles. The stator yoke section at each pole includes magnetic restriction means, such as an elongated terminal or slot, extending transversely across the yoke section in association with a preselected coil accommodating slot spaced at a predetermined electrical angle $\theta$ from each coil group axis in the rotational direction of the revolvable member. This assists in the production of a quadrature axis having minimum permeance ninety electrical degrees away from the means, with the direct axis and maximum permeance being in the region of the restriction means. The arrangement furnishes a high reluctance in the magnetic path of the quadrature axis flux and effects a phase shift in the flux components during starting conditions. For a satisfactory balance of starting and running performances, angle $\theta$ should be between 20° and 70° from the coil group axis and the ratio of the quadrature axis magnetizing reactance to the direct axis magnetizing reactance should be in the range from 0.25 to and including 0.70.

By a further aspect of the present invention, at least one preselected tooth section terminal portion in the direction of rotation opposite to the rotational direction of the revolvable member, adjacent the quadrature axis, is located at a greater distance from the axis of rotation than those terminal portions disposed in the vicinity of the preselected coil accommodating slots. This construction provides, in effect, a magnetic restriction and reluctance at the bore for the direct axis flux.

Among other advantageous features of the present invention is the satisfactory elimination of the auxiliary winding in stators employed for single-phase induction type motors without necessitating substantial changes in stator fabricating equipment and techniques. Further, while further simplicities and economies are achieved in the production of these types of motors, and distinct quadrature and direct axes created, a winding of the highly desirable distributed concentric wound kind may still be utilized.

The subject matter which I regard as my invention is set forth in the appended claims. The invention itself, however, together with further objects and advantages thereof may be better understood by referring to the following more detailed description taken in conjunction with the accompanying drawings.

Brief description of the drawings

FIGURE 1 is an end elevational view of stator and rotor members, partially broken away and partially in schematic form to illustrate one embodiment of the present invention incorporated in a two pole single-phase induction electric motor;

FIGURE 2 is an enlarged fragmentary view of a portion of a stator lamination seen in the stator of FIGURE 1;

FIGURE 3 is a fragmentary plan view of a portion of the stator core seen in FIGURE 1;

FIGURE 5 is a circuit diagram to reveal one way in which the quadrature axis and direct axis magnetizing reactances for the electric motor of FIGURE 1 may be measured;

FIGURE 6 diagrammatically illustrates a four pole single-phase induction electric motor incorporating a variation of the form of the present invention revealed in FIGURES 1 and 2;

Description of the preferred embodiments

Figure 8:
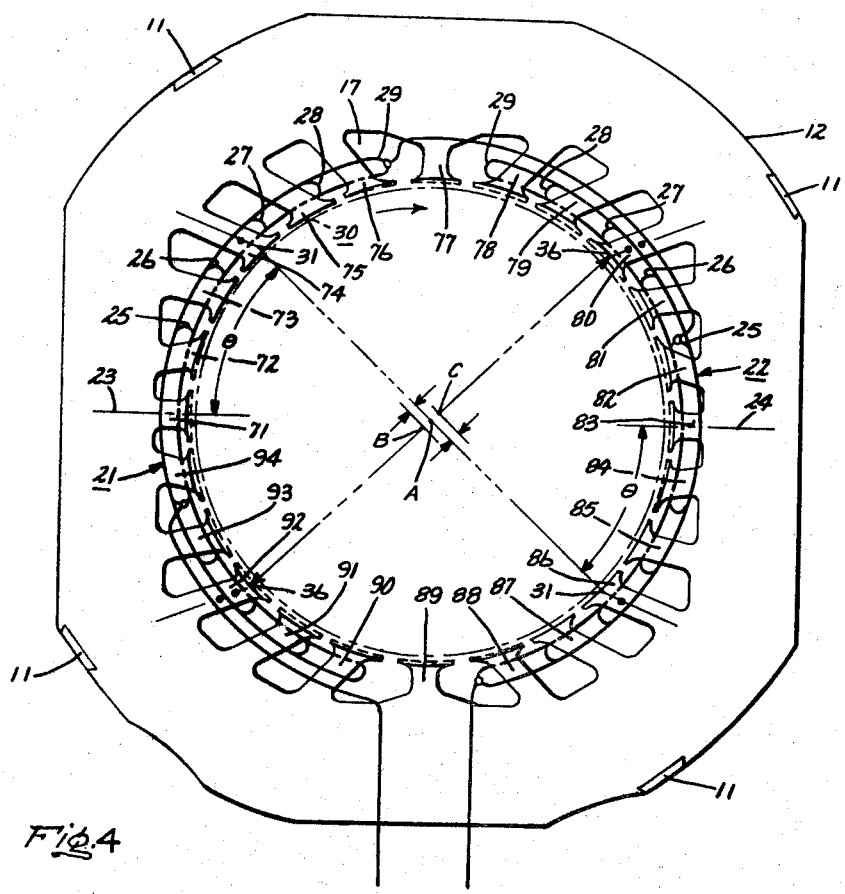
FIGURE 8 is an end elevational view, partially in diagram, of yet another form of this invention.

Referring now to the drawings in more detail, and in particular to the form of the invention revealed by FIGURES 1, 2, and 3, for purposes of illustration that form has been shown embodied in a two pole, single-phase induction electric motor. As seen in FIGURE 1, the stator for the motor, generally indicated by numeral 10, includes a laminated core fabricated of a stack of laminations composed of magnetizable iron, electrical steel material, or the like suitably fastened together, such as by the common key and groove arrangements indicated at 11. The core has a magnetizable yoke section 12 and a plurality of inwardly projecting, angularly spaced apart teeth sections 13, which are integrally joined at one end to the yoke section and have enlarged terminations 14 at the other end to define a rotor receiving bore 16. Sections 12 and 13 together form a plurality of coil accommodating slots 17 (twenty-four being shown) which have slot entrances 18 provided by adjacent terminations in communication with bore 16. The stator core so far described and seen in FIGURE 1, including its configuration and number of slots 17, is one which is in commercial use today and has been chosen as an exemplification to show the ease in which one form of the present invention may be incorporated in such cores.

The core of the exemplification in FIGURE 1 carries a distributed wound main field or primary winding having two coil groups 21, 22 disposed in the slots symetrically about coil group axes 23, 24 respectively located 180 electrical degrees apart at opposed teeth sections 13a, 13b. As shown, each coil group comprises five concentrically arranged coils 25, 26, 27, 28, and 29, wound of suitable turns of wire to approximate the highly desirable sinusoidal ampere-turn pattern. The coils in each group span three, five, seven, nine, and eleven teeth sections respectively to provide two magnetic poles of instantaneous alternate polarity. Instead of employing an auxiliary winding on the core having two magnetic poles conventionally spaced 90 electrical degrees from coil group axes 23, 24 and normally excited along with the main winding for running and/or starting conditions, I furnish an arrangement which attains satisfactory starting and running performace without use of the auxiliary winding.

More specifically, and still referring to FIGURE 1, I furnish a magnetic restriction transversely across the yoke section for each magnetic pole at a predetermined electrical angle $\theta$ from the associated coil group axis taken in the direction of rotation (see the arrow) about rotational axis A for revolvable member, generally indicated by numeral 30. This restriction is associated with a preselected slot in each magnetic pole; e.g., slot 17a, and establishes a distinct quadrature axis 31 having minimum permeance or maximum reluctance at a location spaced ninety electrical degrees therefrom, the restriction presenting a high reluctance to and being in the magnetic path of the quadrature flux traveling through the yoke section during operation of the motor. The ninety electrical degrees is measured from the center of entrance 18 for slot 17a. Thus, in the exemplification, the quadrature axis, at least in theory, projects through the center of the entrance for slot 17b. It should be noted at this time that the direct axis 36, where maximum permeance or minimum reluctance occurs, is in turn spaced 90 electrical degrees from the quadrature axis (measured at the bore), the axis extending through the magnetic restriction furnished in the yoke section.

With reference to the illustrated restriction, it is in the form of an elongated, generally radial and relatively narrow slot or channel 32 which extends entirely through the axial length of the laminated stack. The outermost end 33 of the slot is in communication with the outer periphery of the stator core as shown best in FIGURE 3 and the innermost end 34 terminates adjacent the center of a preselected slot 17a. This slot may be conveniently cut into the yoke section during the lamination punching operation or after the laminations have been secured together. Although this construction provides a reluctance slot which serves as a high reluctance flux barrier in the path of the quadrature flux, it does not impair the flux path for the direct axis flux, thereby minimizing the tendency to create space harmonies for the direct axis flux. For best magnetic restricting results, the minimum dimensional width of slot 32, denoted by letter $a$ in FIGURE 2, should not be less than 0.010 inch (10 mils) and should be preferably in the order of 0.030 inch or above for fractional and small horsepower size motors. In addition, when the stator is mounted within a shell which has a portion arranged next to end 33 of slot 32, the shell should be fabricated of non-magnetic material so that it does not furnish a magnetic path circumventing slot 32.

In the embodiment of FIGURES 1 and 2, a small saturable bridge 37 is provided between slot end 34 and winding accommodating slot 32, for example 0.05 inch in radial depth, and slot end 34 is enlarged to furnish a longer non-magnetic path across it so that some of the quadrature flux will be forced through the magnetic bridge 37 for rapidly saturating the bridge. Although ideally slot 32 should extend entirely through the yoke section, between the outer periphery of the core and the preselected slot 17a, the relatively narrow bridge 37 permits the manufacture of the individual laminations in one piece and the laminated stator core as a single integrated unit without interfering with the direct axis flux path or materially affecting the operating characteristics of the motor. Since elongated slots 32 extend transversely across a major portion of the yoke section thereby tending to weaken the structural strength or rigidity of the core, it is preferable to fill slots 32 with suitable non-magnetic bonding material 38, such as hardened or cured adherent epoxy resin, for attaining the desired rigidity characteristics for the core. This bonding material in its unhardened form may be readily applied into the elongated slots 32 after the laminations have been aligned in stacked relation but before suitable coil slot liners or other slot insulation and the main winding coil groups have been installed in the coil accommodating slots of the core.

Returning now to a consideration of the preferred location of elongated slots 32 relative to the coil group axes 23, 24, as noted previously in theory, electrical angle $\theta$ is measured from the given coil group axis at the bore to the center of entrance 18 for coil accommodating slot 17a, the preselected slot of the magnetic pole associated with the innermost end 34 of elongated slot 32. By distorting the yoke section in this manner, a phase shift between the two components of flux is produced, with maximum starting torque occurring when angle $\theta$ is approximately 45 electrical degrees. It has been discovered that the starting torque decreases as that angle departs from 45° and, as a practical matter, satisfactory operation is obtained for most applications, balancing starting torque against running performance having full load efficiencies well over 40%, when angle $\theta$ is in the range from approximately 20° to about 70° for a given pole. Taking, for instance, the twenty-four slotted type core of the exemplification, the slots are evenly spaced apart and have slot entrance centers arranged every fifteen electrical degrees, with slots 17a being located 67.5 electrical degrees from the associated coil group axes 23, 24. Even though the angular location of the slot 32 is near the upper limit of the range, motors constructed in the manner revealed by FIGURES 1, 2, and 3 exhibited unusually good torque and running characteristics.

In particular, the stators for such motors were fabricated with an outer diameter across one set of slots of 5.40 inches and 6.00 inches across the other set. The bore diameter was 3.480 inches, while the stack length was in the order of 0.8 inch. The depth of the yoke section varied from a minimum of 0.60 inch to a maximum of 0.89 inch. Elongated slot 32 had the following dimensions: 0.812 inch radial depth, width $a$ was 0.03 inch. Each coil group was comprised of four coils 26, 27, 28, and 29 having twenty-four, twenty-eight, thirty-four and thirty-eight turns respectively, .0453 aluminum wire having a 2.2 ohm resistance. All given dimensions and measurements are nominal ones.

Figure 4:
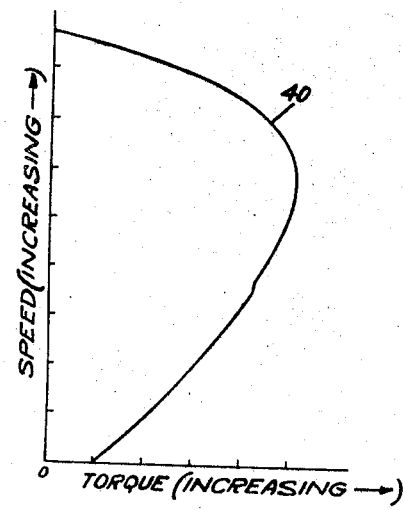
FIGURE 4 is a representative speed-torque curve for electric motors which embody one form of the present invention.

Revolvable member 30 was similar to that illustrated, having thirty-four equally spaced apart winding slots 43 which were ¼ inch deep filled with case non-magnetic conductors 44; e.g., aluminum, of a squirrel cage secondary winding. The conductors, skewed 15°, were integrally joined at each end of a laminated rotor core by an end ring 46 of relatively high resistance. The following are typical performances for the tested motors: full loss efficiency of 45.8 at 3100 r.p.m.; and 284 watts output break-down torque over 11.1 ounce-feet at a speed of approximately 2800 r.p.m.; and overall speed-torque characteristic akin to curve 40 in FIGURE 4.

It has been found in actual practice that, generally speaking, the lower the ratio of quadrature axis magnetizing reactance $Xmq$ to direct axis magnetizing reactance $Xmd$, the higher will be the starting torque, but the lower will be the running performance (e.g., reduction in running efficiency). To derive advantageous results with the present invention in effecting a satisfactory balance between starting and running operations for most suitable applications, the ratio of $Xmq/Xmd$ should be in the range from 0.25 to and including 0.70.

FIGURE 5 schematically reveals one way in which the quadrature and direct axes magnetizing reactances may be ascertained for use in the above-mentioned ratio. Taking the stator core in FIGURE 1, by way of illustration, prior to installation of coil groups 21, 22 a distributed winding 41 is disposed symmetrically about either the quadrature axis or the direct axis, depending upon the reactance being determined. Winding 41 is chosen such that it provides a selected number of effective turns per pole in an approximate sinusoidal pattern. A distributed winding 42, carried by a wound armature, is furnished with the same number of effective turns per pole as that employed for winding 41. The armature is then positioned into the bore of the stator so that the pole group centers of windings 41 and 42 are in radial register. Alternating current is then applied to one of these windings, with the other winding being in open circuit, and the magnitude of applied current is measured, as shown at $I_A$ in FIGURE 5 for one winding and voltage $V_S$ is taken across the other winding. The magnetizing reactance $X_M$ for the axis being determined is equal to voltage $V_S$ divided by current $I_A$.

Assuming for instance that the direct axis magnetizing reactance $Xmd$ is to be determined for the stator core of FIGURE 1, a coil group having six concentric coils may be disposed symmetrically about each slot 17a such that the coils span 2, 4, 6, 8, 10 and 12 teeth respectively. Assuming further that the chosen number of effective turns per pole is 100, then the effective turns produced by the individual coils of each pole (inside to outside) should be as follows: 8.627, 16,666, 23.570, 28.867, 32.198, and 16.666. Assuming additionally that the wound armature has thirty slots with the armature winding 42 having 100 effective turns per pole, each armature coil group may then consist of six coils per pole having the following effective turns, innermost to outermost: 11.0, 15.86, 20.05, 23.36, 25.60, and 26.80. When 115 volt, 60 cycle, alternating current power is applied to the armature winding, the armature current $I_A$ and the stator winding voltage $V_S$ are measured. The magnetizing reactance for the direct axis $Xmd$ will therefore equal $V_S/I_A$. Determination of the quadrature axis magnetizing reactance may also be determined in the same way, with windings 41 and 42 being in radial alignment with the center of slot 17b in FIGURE 1.

From the foregoing, it will be apparent that among other benefits, a motor having a stator constructed in accordance with one form of the present invention may include adequate starting and running operation for many applications and the need for an auxiliary winding obviated. In addition, equipment employed today for punching out individual laminations may still be utilized and the stator cores using these laminations may be easily modified to incorporate the present invention without necessitating a complete change of lamination and equipment design. This, in turn, results in savings in both equipment and material and an inexpensive single-phase induction motor. It will also be recognized that the present invention has utility in motors having both auxiliary and main windings to increase the starting torque for these motors, if desired.

It will further be appreciated by those skilled in the art that the principles of the invention enumerated above are applicable to stators for use in electric motors operative with more than two poles. In this regard, FIGURE 6 shows a form of the present invention in connection with a four pole electric motor and like parts are illustrated by like references used to describe the motor shown in FIGURES 1–3 inclusive, the stator of FIGURE 6 is essentially the same as that already described differentiating principally in the configuration and number of coil slots 17, number of coil groups, and the precise location and shape of the yoke magnetic restriction means. The stator core is one in common use today, having thirty-six slots 17, the slot entrances 18 being positioned apart at twenty electrical degree intervals. In order to form four magnetic poles, the distributed main winding comprises four standard coil groups 51–54, inclusive, with each coil group being defined by those concentric coils 56, 57, and 58 symmetrically disposed around coil group axis 59 which passes through the center of a central slot 17c. The coils are deployed to provide an approximate sinusoidal ampere turn-pattern, for example, twenty-four, twenty-nine, and thirty-six turns, innermost to outermost coil per group.

In the exemplification of FIGURE 6, the magnetic restriction in the yoke section in each polar region is furnished by an elongated slot 32a extending entirely across the yoke section in direct communication with the preselected coil slot 17a. Thus, the yoke section is divided in effect into four similar segments. Consequently, in order to manufacture this stator, the core should first be secured together, as by the key and groove arrangement 11 and then suitably held at each polar region as elongated slots 32a are cut across the yoke section at the desired locations. While the core is still being held, bonding material 38 in an unhardened state is applied and after the material has hardened, the core may be released to complete the fabrication of the stator; e.g., installation of coil slot insulation and of the coil groups.

From a comparison of elongated slots 32a in FIGURE 6 with those of FIGURES 1 and 2, it will be appreciated that the exact relative positions of the magnetic restrictions and the associated preselected coil accommodating slots 17a are not fixed in order to retain the benefits of the present invention. For instance, in FIGURE 6, the elongated slots 32a are parallel with the coil group axis for the coil group in the same magnetic pole and terminate in communication with the preselected slot 17a at an off-center position. In this embodiment, the center of the entrance for the preselected slot 17a is at an electrical angle θ of 60° from the coil group axis 59 in the direction of rotation for revolvable member 30. In FIGURE 6, the magnetic restrictions establish the quadrature axis 31 centrally of tooth section 13c ninety electrical degrees away from the entrance slot to preselected slot 17a, with the direct axis being located as indicated by broken line 36. The advantageous features of the stator are similar to those already set out for the stator of the first embodiment and will not be further discussed.

Figure 7:
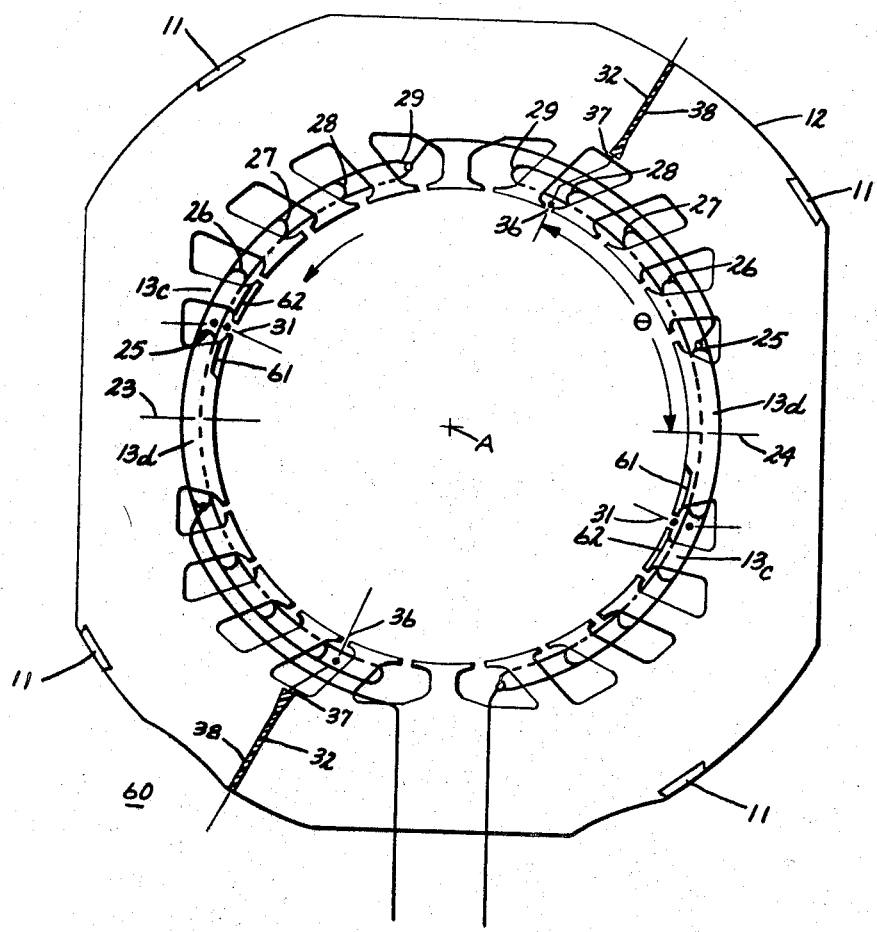
FIGURE 7 is an end elevational view, partially in diagram of another form of the present invention.

FIGURE 7, where like parts already discussed have like references, shows a stator 60 adapted for use in a two-pole single-phase electric motor which essentially conforms to that described in regard to FIGURE 1, except that stator 60 has an enlarged tooth section 13d centrally of each magnetic pole instead of three smaller ones surrounded by innermost coil 25. In addition, a magnetic restriction is furnished adjacent the quadrature axis by removal of the trailing tip portion of tooth section 13d, as indicated at 61, and removal of the enlarged tip at 62 for tooth section 13c positioned on the other side of the quadrature axis. The terminal portions 61, 62 are thus disposed further away from rotational axis A than the remaining terminal portions by, for instance, 0.05 inch. This construction provides an enlarged air gap of high resistivity at this location (e.g., over 50 ohms (mil ft.)) and a magnetic restriction at the bore primarily in the path of the direct axis flux to augment the phase shift between the two flux components. In order to assist in retaining the sides of the coils and usual slot wedges within the confines of the slots adjacent terminal points 61, 62, several laminations may be employed spaced apart in the stack which still include terminal lips (shown by full lines) without appreciably detracting from the magnetic restriction effect caused by removal of the lip portions from the other laminations at that angular location.

Referring now to FIGURE 8 where similar components are illustrated by the same references, another embodiment of the present invention is revealed in connection with a stator adapted for use in a two-pole single-phase electric motor. The stator includes a laminated core having coil accommodating slots 17 of the same configuration as those shown in FIGURE 1 and two similar coil groups 21, 22 symmetrically disposed about coil group axes 23, 24. In this exemplification, the terminal portions of the individual tooth sections vary in radial distance from the rotational axis A in a predetermined non-circular fashion to create magnetic restriction means and establish the quadrature and direct axes 31, 36 respectively, with the shift in phase between the flux components. For convenience in discussion, the twenty-four illustrated tooth sections are identified by references 71–94 inclusive, with the coil group axes 23, 24 being disposed centrally of sections 71, 83 respectively 180 electrical degrees apart.

For purposes of illustration, the quadrature axis 36 and direct axis 31 are established 45 electrical degrees away from coil group axes 23, 24. Axis 31 is centrally of tooth sections 74, 86 while axis 36 is centrally of tooth sections 92, 80. The terminal portions of the former tooth sections, and preferably of tooth sections 72, 75, 85, and 87 are all the same radial distance from A, a minimum dimension from the rotational axis. The maximum distance of the terminal portions is provided for tooth sections 92, 80. If desired, several uncut punchings may be used for reasons given for the stator of FIGURE 7. Satisfactory results have been obtained in actual practice for a stator constructed in the illustrated form having a minimum radial dimension of 1.74 inch and a maximum radial dimension at 92, 80 of 0.05 inch greater than the minimum measurement.

To derive the maximum benefit from my invention in regard to the stator of FIGURE 8 with respect to the attainment of the most desirable starting torque characteristics, not only should angle θ be 45°, but in addition, the radial dimensions between axis A and terminal portions for tooth sections on either side of sections 92 and 80 should progressively decrease. This may readily be accomplished by spacing circumscribing points B, C away from axis A as indicated in FIGURE 8 (e.g., 0.08 inch) and fabricating the terminal portions of tooth sections 88–94, 71, 72 at radius R away from B and sections 76–84 at distance R spaced from C. The bore thus is formed in effect with magnetic restriction means and the air gap has relatively high resistivity.

The following example is given in order to illustrate more clearly how the invention, as described above for FIGURE 8, has been carried forth in actual practices. A number of stators were constructed as illustrated with a 2.9 ohm aluminum winding 0.0427 in diameter having 19, 28, 33, 39 and 44 wire turns respectively for coils 25–29 inclusive. The stack length was 0.8 inch and the terminal portions were cut to the nominal dimensions already given in connection with the description of FIGURE 8. The following performances are representative of the tested motors:

Locked rotor torque _____ 1.8 oz. ft.
Breakdown torque _____ 10.1 oz. ft. at 2300 r.p.m.
Maximum efficiency _____ 37% at 3000 r.p.m.
Power input at 3000 r.p.m. 524 watts.

From an examination of this performance and comparing it with a stator constructed in accordance with the first embodiment, it will be seen that for the same size stator, the operation of the first embodiment stator is superior even though it does not optimize the location of the quadrature and direct axis as in the stator of FIGURE 8. That is to say, in FIGURE 1, angle $\theta$ is other than 45°. Running performance can, however, be improved (such as efficiencies over 40°) by lengthening stack height and/or decreasing wire size.

Figure 9:
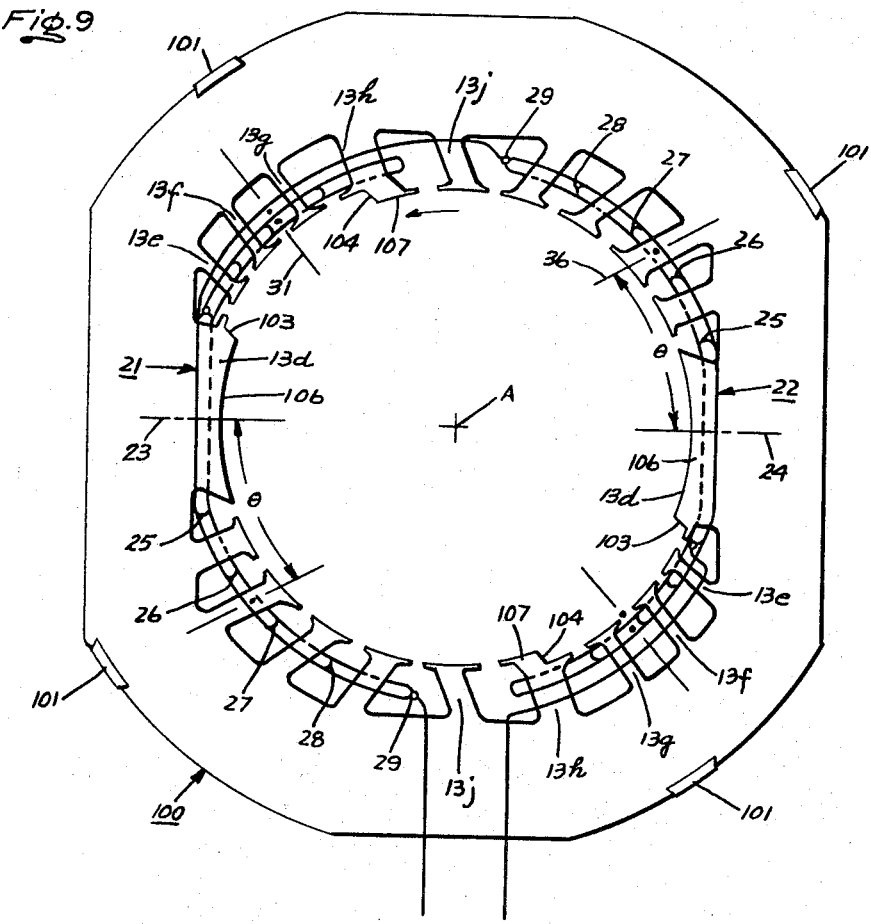
FIGURE 9 is an end elevational view, partly in schematic form, of still another embodiment of the present invention.

In FIGURE 9 another embodiment of the present invention is illustrated and similar components already discussed are identified by the same reference characters. Like that shown in FIGURE 7, stator 100 of FIGURE 9 is adapted for use in a two-pole single-phase electric motor and has enlarged tooth sections 13d centrally of each magnetic pole. Stator 100 incuudes a core fabricated from a number of substantially identical laminations punched out of suitable magnetic material, held together in stacked relation by a standard key and groove structure indicated at 101. Each magnetic pole of the stator has a coil group 21, 22 consisting of five coils 25–29 inclusive disposed generally symmetrical about coil group or polar axes 23, 24, with the coil sides being carried in asymmetrically configured coil accommodating slots as viewed in regard to axes 23, 24.

An unusually effective magnetic restriction is formed in the vicinity of the quadrature axis 31 where permeance is high or maximum in each pole primarily in the magnetic path of the direct axis flux by removing both the trailing tip portion of tooth sectioin 13d at 103 and the leading tip portion of 13h at 104. In addition the terminal portions of intermediate tooth sections 13e, f, and g are disposed further away from the rotational axis A than are terminal portion regions 106, 107 of tooth sections 13d, 13h, section 13; and all of the remaining tooth sections located in the magnetic poles on the side of the polar axis in the direction of rotation, as indicated by the arrow. The air gap in the vicinity of the quadrature axis has a high resistivity (for example, over 50 ohms (mil ft.)) due to this construction, with the phase shift between the two flux componeints being effectively produced. The direct axis 36 is thus located at angle $\theta$ of about forty-five electrical degrees from axes 23, 24.

It should be noted that in regard to stator 100 the terminal portions of all of the tooth sections associated with slots carrying coil sides include enlarged lip tips which assist in retaining the coil sides, slot liners if used and wedges within the slots without interference with the magnetic restriction effect and shift in phase of the flux components. The enlarged lips also augment the structural rigidity of the stator core.

In order to fully appreciate the improved operating characteristics obtainable with the embodiment of FIGURE 9, the following example is given which is representative of a number of electric motors constructed incorporating the stator lamination configuration illustrated in FIGURE 9. The stator had a laminated stack length of 1.5 inch and a nominal bore diameter of 3.48 inches between sections 13d of the two poles and a dimension of 3.73 inches between sections 13f. The winding was formed of aluminum material 0.0605 inch in diameter with 12, 17, 21, 23 and 23 turns respectively for coils 25–29 (75.65 effective turns). The ratio of the quadrature axis magnetizing reactances to direct axis magnetizing axis was in the range from 0.25 to 0.70. The following performance tabulation is representative of a number of the tested motors:

Locked rotor torque _____ 7.0 oz. ft.
Breakdown torque _____ 27 oz. ft.
Maximum full load efficiency _____ 45.8% at 3100 r.p.m.
Power input at maximum efficiency _ 1140 watts.

Figure 10:
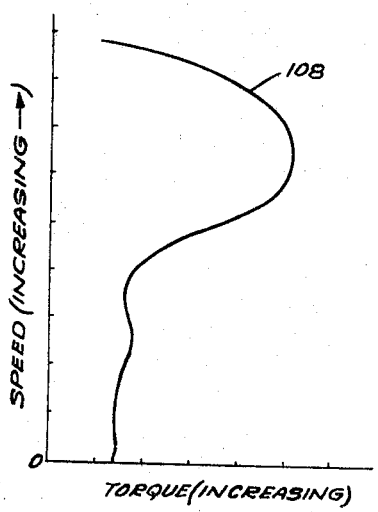
FIGURE 10 is a representative speed-torque curve for electric motors incorporating the embodiment of FIGURE 9.

The motors produced a torque-speed curve similar to that indicated by numeral 108 in FIGURE 10. By choosing a different turn pattern for the coils, the harmonic dip shown in FIGURE 10 may be eliminated, if desired while still retaining a maximum efficiency in excess of 40%. The overall size of the magnetic restriction (e.g., depth and angular width) in the vicinity of the quadrature axis at the bore as well as the location of the direct and quadrature axes are primary factors which control the degree of starting torque and running performance exhibited by the motor.

Figure 11:
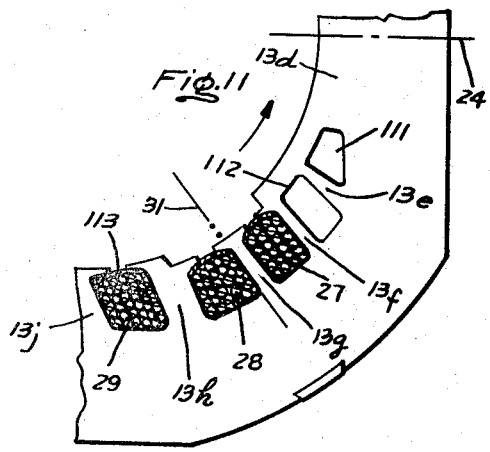
FIGURE 11 is a fragmentary plan view of a portion of a stator modified slightly from that shown in FIGURE 9 to produce a variance in performance from that of FIGURE 9.

FIGURE 11 illustrates one way in which the stator of FIGURE 9 may be readily altered to attain somewhat different performnce characteristics from that of stator 100. By way of exemplification, it will be assumed that a higher efficiency is desired for a given output than that furnished by the stator in FIGURE 9. This may be achieved by alternating the location of the direct and quadrature axes (for example, making angle $\theta$ 35°, that is, disposing the direct axis 35° away from the polar axes) and providing a somewhat smaller restriction with high resistivity near the air gap in the vicinity of the quadrature axes.

More specifically, the enlarged lip of tooth section 13g, the trailing tip of section 13f, and the leading tip of section 13h are disposed further away dimensionally from the rotational axis than are other tooth section terminal portions in the same magnetic poles to form the restriction of the desired magnitude near the air gap. For convenience of manufacture and structural rigidity, part of the terminal portion of section 13f is made integral with those of sections 13e and 13d without closed slots 111, 112 appreciably interferring with the magnetic flux path in the poles. The enlarged lips, like before, assist in retaining the coil sides and wedges 113 within the coil accommodating slots; however, the coil groups now include three coils each (27–29) rather than five as illustrated in FIGURE 9. This construction, even with a 20% reduction in stack length is capable of producing higher efficiencies than that of stator 100, although for a given output the starting torque will be slightly less.

Consequently, it will be appreciated from the foregoing disclosure that the present invention has a number of advantageous features and benefits. Quadrature and direct axes having minimum and maximum permeance respectively can be established at controlled positions in the motor and a phase shift in flux components readily effected for starting conditions. Thus, even though the necessity for an auxiliary winding is obviated, satisfactory starting and running performances may be easily obtained. In addition, the foregoing may be achieved without requiring substantial changes in existing stator fabricating equipment and techniques. The resulting stator is simple in construction and economical to build, allowing the use of cores and main windings of the general type being utilized today, if so desired, having two or more magnetic poles.

It should be apparent to those skilled in the art that while I have shown and described what at present is considered to be the preferred embodiments of my invention in accordance with the patent statutes, changes may be made in the structures disclosed without actually departing from the true spirit and scope of this invention, and I therefore intend to cover in the following claims all such equivalent variations as fall within the invention.

What I claim as new and desire to secure by Letters Patent of the United States is:

1. In a single-phase induction electric motor having a member revolvable about an axis of rotation, a stator including a core formed of magnetizable material having a yoke section and having a plurality of angularly spaced apart tooth sections joined to said yoke section; said sections forming a plurality of angularly spaced apart coil accommodating slots, with said tooth sections having terminal portions forming a bore for receiving the revolvable member; a plurality of coil groups having a number of coils positioned in the slots to form at least two magnetic poles, with the coils of each group being symmetrically disposed with respect to an associated coil group axis; magnetic restriction means formed in said yoke section associated with a preselected coil accommodating slot spaced at a predetermined electrical angle from each coil group axis in the rotational direction of the revolvable member in the region of a direct axis having maximum permeance; said magnetic restriction means producing a quadrature axis having minimum permeance approximately 90 electrical degrees away from said means; and at least one preselected tooth section terminal portion being spaced from each coil group axis in a direction opposite to the rotational direction of the revolvable member; each of said preselected tooth section terminal portions being located at a greater distance from the axis of rotation than those terminal portions of tooth sections disposed adjacent said preselected slots, and being located in the vicinity of the associated quadrature axis.

2. The stator of claim 1 in which the ratio of the quadrature axis magnetizing reactance to the direct axis magnetizing reactance is not substantially less than 0.25 nor substantially greater than 0.70.

3. In a single-phase induction electric motor having a revolvable member, a stator including a core formed of magnetizable material having a yoke section and having a plurality of spaced apart tooth sections joined to said yoke section; said sections forming a plurality of spaced apart coil accommodating slots; at least two coil groups having a number of coils positioned in the slots and spanning predetermined tooth sections with the coils of each group being distributed about a coil group axis; said yoke section including magnetic restriction means formed in said yoke section spaced at a preselected electrical angle with respect to the coil group axis in the direction of rotation for the revolvable member in the vicinity of a direct axis having maximum permeance; each of said magnetic restriction means producing a quadrature axis at a location approximately ninety electrical degrees therefrom having minimum permeance.

4. The stator of claim 3 in which the magnetic restriction means includes an elongated slot extending transversely across a major part of the yoke section, with an end of the slot being positioned next to a preselected coil accommodating slot disposed in spaced relation with an associated coil group axis; and the ratio of quadrature axis magnetizing reactance to direct axis magnetizing reactance being in the range from 0.25 to and including 0.70.

5. The stator in claim 4 in which each elongated slot is filled with non-magnetic bonding material for strengthening the yoke section.

6. The stator in claim 3 in which the preselected electrical angle is within the range of 20–70°.

7. In a single phase induction electric motor having a member revolvable about an axis of rotation; a stator including a core formed of magnetizable material having a yoke section and having a plurality of spaced apart tooth sections joined to said yoke section; said sections forming a plurality of spaced apart coil accommodating slots, with said tooth sections having terminal portions forming a bore for receiving the revolvable member; at least two coil groups each having a plurality of coils distributed in the slots disposed about an associated coil group axis; at least one preselected tooth section terminal portion being spaced from each coil group axis in a direction opposite the rotational direction of the revolvable member in the vicinity of a quadrature axis having low permeance; said preselected terminal portions being located at a greater distance from the axis of rotation than the remaining terminal portions; a direct axis having high permeance spaced ninety electrical degrees from the quadrature axis in the direction of rotation for the revolvable member, the tooth terminal portions adjacent the direct axis being the least distance from the rotational axis of all of said treminal portions, with said bore being generally oblong in shape.

8. In a single-phase induction electric motor having a member revolvable about an axis of rotation; a stator including a core formed of magnetizable material having a yoke section and having a plurality of spaced apart tooth sections joined to said yoke sections; said sections forming a plurality of spaced apart coil accommodating slots with said tooth sections having terminal portions forming a bore for receiving the revolvable member to define an air gap with the outer periphery of the revolvable member, at least two coil groups having a number of coils positioned in the slots with the coils of each group being disposed about an associated coil group axis; at least one preselected tooth section terminal portion being associated with and spaced from each coil group axis in a direction opposite to the rotational direction of the revolvable member in the vicinity of a quadrature axis; said at least one preselected tooth section terminal portion being located at a greater distance from the axis of rotation than the remaining tooth section terminal portions, with the space between the outer periphery of the revolvable member and the at least one preselected tooth section terminal portion associated with each coil group axis being of relatively high resistivity.

9. The stator of claim 8 in which a direct axis is spaced from each coil group axis in the direction of rotation for the revolvable member and the cross section of the air gap located adjacent the direct axis is a minimum, with the tooth terminal portions forming a generally oblong-shaped bore.

10. The stator of claim 8 in which a direct axis is spaced from each coil group axis in the direction of rotation for the revolvable member and the ratio of quadrature axis magnetizing reactance to direct axis magnetizing reactance is in the range from 0.25 and including 0.70.

11. The stator of claim 8 in which the core is laminated and at least one but not all of the core laminations has all of the tooth section terminal portions located at approximately the same radius from the axis of rotation.

12. The stator of claim 8 in which the yoke section includes magnetic restriction means spaced at a preselected angle with respect to each coil group axis in the direction of rotation for the revolvable member in the vicinity of a direct axis having maximum permeance; with a quadrature axis of minimum permeance being displaced approximately ninety electrical degrees therefrom.

13. The stator of claim 12 in which the magnetic restriction means includes an elongated slot extending across a major part of the yoke section in the vicinity of the direct axis, and the ratio of the quadrature axis magnetizing reactance to direct axis magnetizing reactance is generally in the range from 0.25 to and including 0.70.

14. The stator of claim 8 in which the tooth section terminal portions associated with coil accommodating slots include enlarged lips to assist in retaining sides of coils and slot wedges within the associated slots, and the enlarged lips of the at least one tooth section terminal portion associated with each coil group axis being located in the vicinity of a quadrature axis where permeance is low without appreciably detracting from a magnetic restriction effect at that location.

15. In a single-phase induction electric motor having a member revolvable about an axis of rotation, a stator including a core formed of magnetizable material having a yoke section and having a plurality of angularly spaced apart tooth sections joined to said yoke section; said sections forming a plurality of angularly spaced apart coil accommodating slots, with said tooth sections having terminal portions; a plurality of coil groups having a number of coils positioned in the slots to form at least two magnetic poles each having a polar axis; at least one preselected tooth section terminal portion being spaced from the polar axes in a direction opposite to the rotational axis of the revolvable member in the vicinity of a quadrature axis where permeance is low, and being located at a greater distance from the axis of rotation than other tooth section terminal portions in the same magnetic pole; said at least one preselected tooth section terminal portion further being associated with coil accommodating slots and having an enlarged lip to assist in retaining sides of coils and slot wedges within the associated slots; and the stator having a direct axis where permeance is high for each magnetic pole displaced approximately 90 electrical degrees from the quadrature axis.

16. The stator of claim 15 in which the ratio of the quadrature axis magnetizing reactance to the direct axis magnetizing reactance is not substantially less than 0.25 nor substantially greater than 0.70.

References Cited

UNITED STATES PATENTS

| | | | |
|---|---|---|---|
| 2,125,309 | 8/1938 | Oswald | 310—172 |
| 2,810,846 | 10/1957 | Hammerstrom | 310—172 |
| 3,207,935 | 9/1965 | Mosovsky | 310—172 |
| 3,235,761 | 2/1966 | Nohen | 310—192 |

J. D. MILLER, *Primary Examiner.*

L. L. SMITH, *Assistant Examiner.*

U.S. Cl. X.R.

310—192